April 26, 1960 J. A. LOWN 2,934,248
STATION WAGON PLATFORM ACCESSORY
Filed June 25, 1956 2 Sheets-Sheet 1
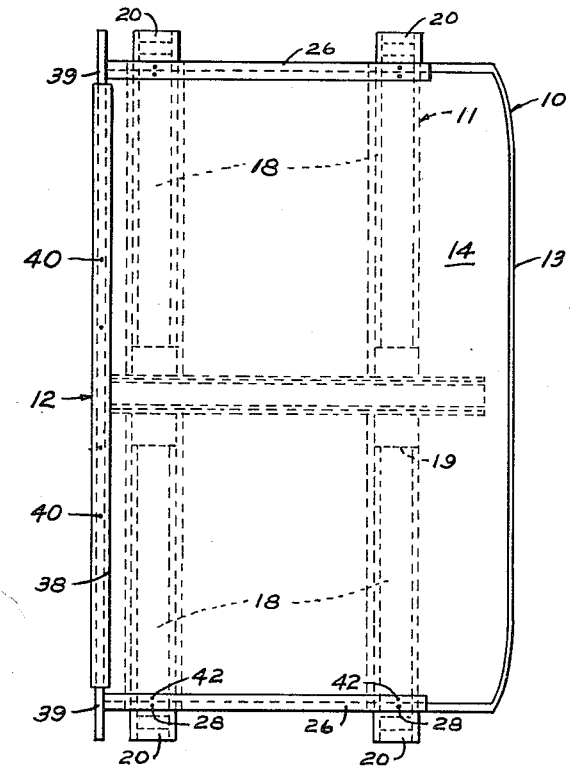
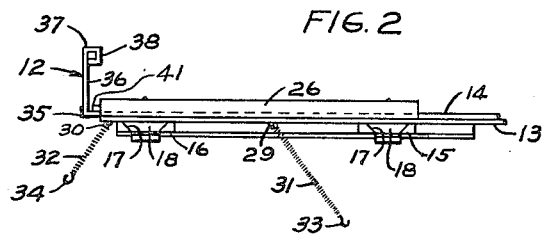
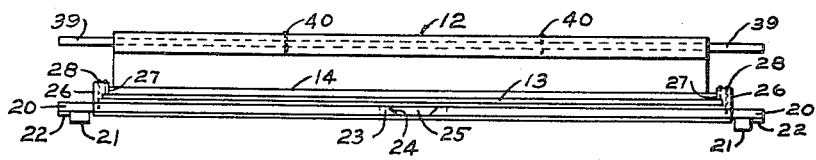
INVENTOR.
JACK A. LOWN
BY Williamson, Schroeder,
Adams + Meyers
ATTORNEYS April 26, 1960 J. A. LOWN 2,934,248
STATION WAGON PLATFORM ACCESSORY
Filed June 25, 1956 2 Sheets-Sheet 2

INVENTOR.
JACK A. LOWN
BY *Williamson, Schroeder,*
*Adams + Meyers*
ATTORNEYS

United States Patent Office 2,934,248
Patented Apr. 26, 1960

2,934,248

STATION WAGON PLATFORM ACCESSORY

Jack A. Lown, Minneapolis, Minn.

Application June 25, 1956, Serial No. 593,495

5 Claims. (Cl. 224—42.42)

This invention relates to an accessory for station wagon vehicles, and more particularly to an extensible platform device for improving the carrying efficiency of the vehicle.

The conventional station wagon is constructed with luggage-carrying space rearwardly of the seat members and such space extends from the floor of the vehicle to the ceiling thereof. In certain circumstances, the entire space is utilized from the floor to the ceiling, but more often the space is utilized for a plurality of smaller articles such as boxes and suitcases. If it is desired to remove a box or the like from a lower position, it becomes necessary to first unload those articles which overlie the one to be removed. It is within the contemplation of this invention to minimize the problem of inaccessibility by dividing the vertical space at the rear of such vehicle, and, at the same time, to add other cooperative features which will generally increase the utility of the vehicle.

It is a general object of the invention to provide a platform structure which is capable of being carried compactly on the rear floor of a station wagon-type automotive vehicle and which may be adjusted for support across the window frames at the rear of the vehicle.

Another object of the invention is to provide a dual platform device for mounting at the rear of a station wagon and extensible rearwardly or forwardly to increase the supporting surface thereof.

A further object of the invention is to provide versatile supporting means for a platform device of the class described which will cooperatively engage conventional vehicle parts and be secured in several positions against accidental collapse or shifting.

These and other objects and advantages of the invention will more fully appear from the following description, made in connection with the accompanying drawings, wherein like reference characters refer to the same parts throughout the several views and in which:

Figure 1 is a top view of my accessory with the platforms in registered relation;

Figure 2 is a side view of the accessory, showing the luggage retainer and platform support in upper position and with the spring members in extended and operative position;

Figure 3 is a rear view of the structure;

Figure 4:
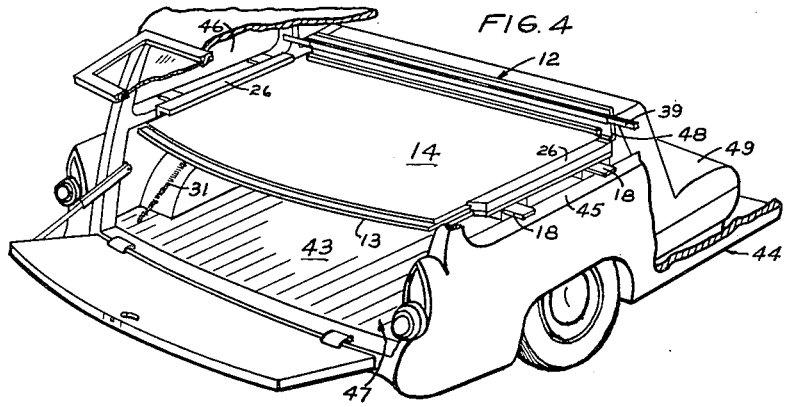
Figure 4 is a perspective view of the rear end of a station wagon, portions being cut away to show the cooperation of the accessory with the luggage retainer and platform support in upper position.
Figure 5:
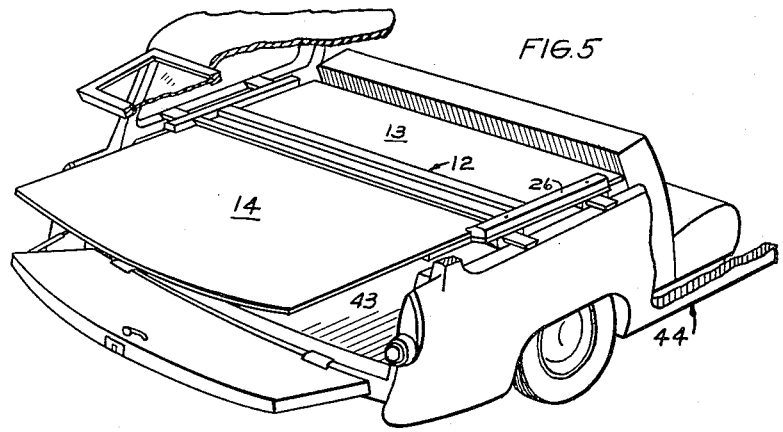
Figure 6:
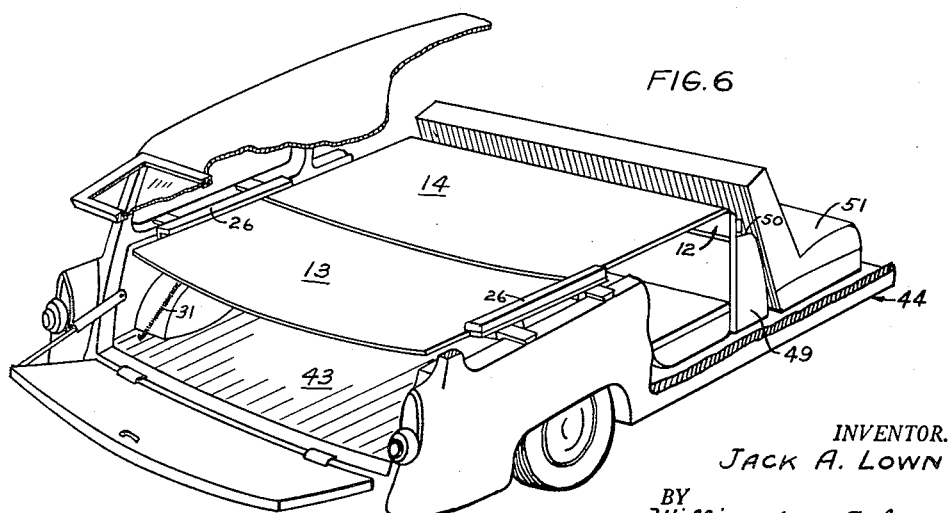

Figure 5 is a perspective view similar to Figure 4, showing the slidable platform portion rearwardly extended to increase the platform area; and Figure 6 is another perspective view of the rear end of a station wagon showing the rearmost seat in collapsed form and with the movable platform extended forwardly with the luggage retainer and platform support in lower supporting relation with the collapsed seat.

With continued reference to the drawing and particularly to Figures 1, 2 and 3, my station wagon platform accessory consists generally of a platform structure 10, a side supporting structure 11 and a luggage retainer and platform support 12. The platform structure comprises, in turn, a fixed platform 13 and a slidable platform 14, the cooperative relationship of which will be discussed in more detail below.

The side supporting structure 11 comprises lateral brace members 15 at the rear and 16 at the fore. These brace members extend to side edges of the platform structure and lie in spaced parallel relationship secured to the underside of platform 13. The lateral brace members 15 and 16 are provided each with a guideway or slot 17 which is preferably beveled as shown in Figure 2. Received within each of the guideways in endwise relation at each side of the platform structure is a side support 18 which terminates at its inner end at 19 and extends outwardly at 20, as shown in Figure 1. Each side support is provided at its outwardly extending end with a stop block 21 inwardly spaced far a short distance at the underside thereof and a rubber foot 22 adjacent the stop block 21 and underlying the outermost margin of each side support.

Also secured to the underside of the fixed platform 13 is a longitudinal brace 23 which extends for the length of the fixed platform and is located medially of the side edges. The longitudinal brace 23 has a slot or groove 24 which may be beveled as shown in Figure 3 to slidably retain a rear support 25 so that this support member may be extended rearwardly of the fixed platform. The lateral brace members may abut the longitudinal brace at their inner ends as shown in Figure 1.

At each side of the fixed platform 13 is secured a guide block 26, the block being secured to the upper margin thereof and being provided with an inwardly formed flange or shoulder 27, as shown in Figure 3. Lock pins 28 are removably secured through the guide blocks 26 in alignment with the side supports 18 and adapted to engage each of the side supports for retaining the support in pre-selected extended position with respect to the platform structure.

Eye-hooks 29 and 30 may be secured to the underside of the fixed platform 13 in spaced relation at each side thereof for retaining the upper ends of tension spring members 31 and 32 respectively. Hooks 33 and 34 are formed at the lower ends of the respective springs and are adapted to engage fixed elements on a station wagon as will be subsequently described.

The sliding platform 14 has a width slightly less than that of the fixed platform 13 and is adapted to slide longitudinally between the guide blocks 26 and retained against upward movement by the shoulders or flanges 27. Sliding platform 14 has a luggage retainer and platform support 12 hingedly connected at 35 along the forward edge of the sliding platform 14, as shown in Figure 2. The luggage retainer and platform support comprises an elongated board 36 having an outer edge 37 parallel to the hinge structure 35 and provided with a guide means 38 for slidably retaining a pair of safety bars 39, each adapted to be slidably extended outwardly of the guide means 38 as shown in Figure 1. Lock pins 40 are releasably positionable through the guide means 38 and into predetermined positions on the safety bars 39 so as to hold them in outwardly extended position when desired. An abutment bar 41 is secured laterally of the sliding platform 14 to limit the upward swinging movement of the luggage retainer and platform support 12 in the position shown in Figure 2. The sliding platform 14 is adapted to be moved forwardly with the luggage retainer and platform support extended outwardly and forwardly of the fixed platform 13 or may be slid in the opposite direction rearwardly with the luggage retainer and platform support in horizontal and coplanar relation with the sliding platform 14 to engage the guide blocks 26 beneath the flanges or shoulders 27. It will be noted that the guide means 38 and the abutment bar 41 do not extend to the outer side edges of platform 14 and, hence, will clear the shoulder 27 when it is desired to slide the platform rearwardly. Lock pins 42 extend through the flange or shoulder portions 27 and are adapted to further extend into the side margins of the sliding platform 14 to fix the position thereof with relation to the fixed platform.

Referring now to Figures 4, 5 and 6, the specific mounting and use of my platform accessory is shown in detail. Figure 4 shows the accessory mounted for general use in the rear space 43 of a conventional station wagon 44, the sliding platform 14 being in registry with the fixed platform 13 and the luggage retainer and platform support 12 being in upright position. All of the side supports 18 are extended to engage the lower frame 45 at each rear window 46 and, when thus extended, the stop blocks 21 and the rubber feet 22 are in engagement with the window frame member 45. When thus positioned, the platform structure is firmly supported in spaced relation above the floor 47 of station wagon 44 and is prevented from lateral shifting by the side supports releasably retained in their extended position by means of the lock pins 28. The safety bar 39 is also extended at each side of the luggage retainer and platform support 12 so as to engage the forward edge 48 of each of the windows 46. The springs 31 and 32 are secured with respect to the station wagon 44 to resiliently urge the platform structure downwardly in firm engagement with the windows 46.

Articles such as boxes, clothing and the like may be placed below the platform structure and larger articles such as suitcases, trunks and other luggage may be placed on top of the platform structure. The articles may be independently removed without rearranging or removing other articles.

In the event the vehicle 44 must stop suddenly during travel, the luggage retainer and platform support 12 will prevent luggage from striking seat 49 and the safety bars 39 will prevent shifting of the entire platform forwardly of the window frame portion 48.

Referring now to Figure 5, if it is desired to utilize the platform accessory as a table or for other purpose requiring an extended area, the lock pins 42 are retracted, permitting the rearward sliding of upper sliding platform 14, the luggage retainer and platform support 12 being aligned with the general plane of the sliding platform in the manner shown. The lock pins may be reinserted through the guide blocks at the respective sides of the platforms to retain the sliding platform 14 in a rearwardly disposed position, as shown. When thus used, the luggage retainer and platform support is not required since the vehicle will not be in motion.

Referring now to Figure 6, seat 49 has been retracted to increase the volume of space 43 and an upper portion of the seat 49 provides a horizontal abutment 50 which extends across the vehicle rearwardly of seat member 51. The upper sliding platform 14, with the lock pins 42 withdrawn, is then slid forwardly and the luggage retainer and platform support 12 is swung to depending position with the outer edge 37 in resting engagement with the horizontal abutment 50 to firmly support the forward edge of the platform 14. Again, lock pins 42 may be secured through the guide block and into the sliding platform as previously described. In the forwardly extended position, the platforms may constitute a bed or may be utilized for other purposes requiring an extended area.

It may thus be seen that I have devised a useful platform accessory which has novel cooperation with the rear portion of a conventional station wagon in order to perform several functions which increase the efficiency of the vehicle.

It will, of course, be understood that various changes may be made in the form, details, arrangement and proportions of the parts without departing from the scope of my invention.

What I claim is:

1. A supporting accessory for the rear space of station wagon vehicles and the like having rear opposed windows, said accessory comprising, a fixed platform, a plurality of support elements secured to the fixed platform and laterally extensible for engaging the lower edges of opposed rear windows, a shiftable platform closely overlying said fixed platform and slidable forwardly and rearwardly with respect thereto whereby to increase the effective supporting area of the accessory, guide means longitudinally disposed with respect to said fixed platform and said shiftable platform and maintaining the shiftable platform approximately in the same plane with the fixed platform when shifted, said guide means lying above said support elements in free clearance therewith, and releasable means securing the support elements in their laterally extended positions.

2. A supporting accessory for the rear space of station wagon vehicles and the like having rear opposed windows, said accessory comprising, a fixed platform, support elements secured beneath the fixed platform and laterally extensible for overlying the lower edges of opposed rear windows in supported relation thereon, a shiftable platform slidably secured in overlying relation with the fixed platform, a luggage retainer and platform support hingedly mounted at the forward edge of the slidable platform for swinging to an upper position to retain luggage against forward shifting and swingable to a downward position for supporting the shiftable platform on collapsed seat structure when extended forwardly, and releasable means securing the support elements in their extended positions.

3. A supporting accessory for the rear space of station wagon vehicles and the like having rear opposed windows, said accessory comprising, a fixed horizontal platform, a plurality of brace members rigidly secured to the underside of said fixed platform in lateral disposition thereto, each of said brace members having a guideway formed therealong and terminating outwardly at each side of the fixed platform, a side support slidably received endwise in the guideway of each brace member and extensible outwardly to rest upon the window frame at each side of the vehicle, a guide block secured along each side edge of the fixed platform, a slidable platform mounted in said guide blocks and slidable forwardly and rearwardly from a position overlying said fixed platform, and releasable means securing the side supports in their extended positions.

4. A supporting accessory for the rear space of station wagon vehicles and the like having rear opposed windows, said accessory comprising, a fixed platform, support elements secured beneath the fixed platform and laterally extensible for overlying the lower edges of opposed rear windows in supported relation thereon, open-ended longitudinal guide means secured above the fixed platform, a platform secured in the longitudinal guide means in overlying relation with the fixed platform and shiftable both forwardly and rearwardly with respect thereto, and removable pin means passing through the fixed platform and engageable with said laterally extensible support elements whereby to secure them in their extended positions.

5. A supporting accessory for the rear space of station wagon vehicles and the like having rear opposed windows, said accessory comprising, a fixed horizontal platform, a plurality of brace members rigidly secured to the underside of said fixed platform in lateral disposition thereto, each of said brace members having an open-ended guideway formed therealong and terminating in opposed relation at each side of the fixed platform, a pair of side supports, one each slidably received in the opposed ends of each of said guideways and extensible outwardly to rest upon the window frame at each side of the vehicle, a guide block secured along each side edge of the fixed platform, a platform mounted in said guide blocks and slidable forwardly and rearwardly with respect to said fixed platform in a plane closely parallel to that of said fixed platform, and releasable means securing the side supports in their extended positions.

References Cited in the file of this patent

UNITED STATES PATENTS

| | | | |
|---|---|---|---|
| 1,487,984 | Strain | Mar. 25, | 1924 |
| 1,539,226 | White et al. | May 26, | 1925 |
| 1,555,038 | Thweatt | Sept. 29, | 1925 |
| 1,676,987 | Line | July 10, | 1928 |
| 1,886,217 | Noonan | Nov. 1, | 1932 |
| 1,950,927 | McMillan | Mar. 13, | 1934 |
| 2,232,353 | Votypka | Feb. 18, | 1941 |
| 2,503,602 | Titley | Apr. 11, | 1950 |
| 2,767,896 | Beck | Oct. 23, | 1956 |